Patented Sept. 29, 1925.

1,555,405

UNITED STATES PATENT OFFICE.

EDWIN C. ECKEL, OF WASHINGTON, DISTRICT OF COLUMBIA.

PROCESS OF MAKING CEMENT.

No Drawing.   Application filed April 13, 1925.   Serial No. 22,885.

*To all whom it may concern:*

Be it known that I, EDWIN C. ECKEL, a citizen of the United States, residing at Washington, in the District of Columbia, have invented certain new and useful Improvements in Processes of Making Cements, of which the following is a specification.

In my Patent No. 1,511,323, there is disclosed a process of making cement and iron embodying the use of titaniferous iron ore resulting in the production of metallic iron and a cement containing a titanic constituent, which cement has valuable technical properties among which may be mentioned high specific gravity, resistance to chemical attack, and quick-hardening properties.

The present invention has for its object to produce a titan cement or one having a titanic constituent, by a process which is particularly applicable and economical in regions where titaniferous ores and coke are both expensive, the titaniferous constituent being introduced otherwise than by the reduction of the mixture containing titanic ore as described in my said patent, involving necessarily the omission of iron recovery, as well as producing a cement of higher lime constituent from that produced by the process disclosed in said patent.

The present process includes the use, as one component of a cement mixture, of an artificially prepared titanium compound, either a titanium silicate or a calcium titanate or a mixture of both, as distinguished from the natural titanic iron ore disclosed in said patent.

This artificially prepared titanic compound is added, in proportions suitable to give the final tenor in titanium oxide or other titanic compound desired, to a cement mixture already containing proper amounts of lime, alumina and silica.

The addition of this "titanium base" may be made either before clinkering or fusion or during the actual burning; and the final product is in either case cooled and ground to powder to form the cement.

As an example, in order to make a high-lime titan cement for manufacture in a rotary kiln, the final raw mixture may be composed of 120 lbs. of limestone, 15 lbs. of clay or bauxite, 25 lbs. of titaniferous slag.

The titaniferous slag may for example be the slag resulting from the fusion of the titaniferous iron ores and limestone.

The result with these three raw materials of normal composition would be about 100 lbs. of titan cement, with a composition ranging around lime 60%, silica 10%, titanic oxide 15%, alumina 10%.

The titanic oxide may assume the form of an equivalent calcium titanate, exceeding 10%.

By the use of such a prepared titanium compound sufficient titanic oxide or corresponding compound is introduced by the process into the cement mixture, in a readily combinable form, to secure the increased density and chemical resistance which are characteristic of all the titan cements, as compared with alumina cements, Portland cements, or any other earlier types.

The process herein disclosed is adaptable to the use of either a rotary kiln or furnace, to either clinkering or fusion, and to the use of coke, coal, electricity, gas or oil as fuel. It also permits the attainment of very high-lime titanium cement compounds, which were difficult to attain by direct fusion of a limestone—titaniferous iron ore mixture—tho the low lime quick hardening titan cements are prepared easily enough even at relatively low temperatures directly from the ore. The present invention however provides a new method of introducing a titanium constituent into a normal cement mixture, with the advantages heretofore referred to, and without the incidents attending the use of titaniferous iron ore and the necessity for example of using a blast furnace.

I claim:

1. The process of making cement containing a titanium constituent, comprising the addition to a cement mixture, during or before fusion or clinkering, of a suitable proportion of an artificial titanic compound.

2. The process of making cement containing a titanium constituent, comprising the addition to a normal cement mixture of a suitable proportion of an artificial compound containing titanium.

3. The process of making cement containing a titanium constituent, comprising the addition to a normal cement mixture of a suitable proportion of an artificial compound containing a titanium base.

4. The process of making cement relatively high in titanium comprising the addition to a cement mixture, during or before fusion or clinkering, of a suitable proportion of a slag resulting from fusing titaniferous iron ore and limestone.

5. The process of making cement containing a titanium constituent comprising adding to a cement mixture containing lime, alumina and silica, a suitable proportion of an artificial compound containing titanium, and fusing or clinkering the combined mixture, and finally grinding the same.

6. The process of making cement containing a titanium compound consisting of adding to a calculated cement mixture containing lime, alumina, and silica, a suitable proportion of an artificial compound containing titanium, during the process of clinkering or fusing the mixture.

In testimony whereof, I affix my signature.

EDWIN C. ECKEL.